United States Patent
Das et al.

(10) Patent No.: US 10,183,852 B2
(45) Date of Patent: Jan. 22, 2019

(54) LOAD DEPENDENT ELECTRONIC VALVE ACTUATOR REGULATION AND PRESSURE COMPENSATION

(71) Applicant: DANFOSS POWER SOLUTIONS GMBH & CO OHG, Neumunster (DE)

(72) Inventors: Abhijit Das, Ames, IA (US); Lee Mahlum, Eau Claire, WI (US); Luke Wadsley, Ames, IA (US); Richard Hitchcock, Warrensburg, MO (US); Jeffrey A. Sipila, Ravensdale, WA (US); Larry Joachim, Greenville, SC (US)

(73) Assignee: Danfoss Power Solutions GMBH & CO OHG, Nuemunster (DE)

( * ) Notice: Subject to any disclaimer, the term of this patent is extended or adjusted under 35 U.S.C. 154(b) by 246 days.

(21) Appl. No.: 15/182,875

(22) Filed: Jun. 15, 2016

(65) Prior Publication Data
US 2017/0029256 A1 Feb. 2, 2017

Related U.S. Application Data

(60) Provisional application No. 62/198,877, filed on Jul. 30, 2015.

(51) Int. Cl.
*F16K 31/02* (2006.01)
*B66F 9/24* (2006.01)
(Continued)

(52) U.S. Cl.
CPC ............ *B66F 9/24* (2013.01); *B66F 9/22* (2013.01); *E02F 9/2203* (2013.01);
(Continued)

(58) Field of Classification Search
CPC ...... F15B 21/087; F15B 11/04; F15B 19/007; F15B 2211/057; F15B 2211/6313; F15B 2211/6346; F15B 2211/6656; F15B 2211/75; F15B 2211/761; F15B 2211/6306; F15B 2211/857; E02F 9/22; F16K 31/02; B66F 9/24; B66F 9/22
(Continued)

(56) References Cited

U.S. PATENT DOCUMENTS

| 4,182,126 A | 1/1980 | Blakeslee |
| 4,520,443 A * | 5/1985 | Yuki ............ B66F 9/24 |
| | | 414/273 |

(Continued)

FOREIGN PATENT DOCUMENTS

| CN | 102301582 A | 12/2011 |
| CN | 102537473 A | 7/2012 |

(Continued)

OTHER PUBLICATIONS

JP2000159499A—English translation.
(Continued)

*Primary Examiner* — Minh Le
(74) *Attorney, Agent, or Firm* — Zarley Law Firm, P.L.C.

(57) ABSTRACT

A hydraulic control system that uses system pressure information and a rescaled operator input to command valve spool area to control actuator speed. The system uses soft sealing and/or soft pressure compensation.

19 Claims, 3 Drawing Sheets

(51) Int. Cl.
*B66F 9/22* (2006.01)
*F15B 11/04* (2006.01)
*F15B 19/00* (2006.01)
*F15B 21/08* (2006.01)
*E02F 9/22* (2006.01)

(52) U.S. Cl.
CPC ............ *E02F 9/2228* (2013.01); *F15B 11/04* (2013.01); *F15B 19/007* (2013.01); *F15B 21/087* (2013.01); *F16K 31/02* (2013.01); *F15B 2211/6306* (2013.01); *F15B 2211/6313* (2013.01); *F15B 2211/6346* (2013.01); *F15B 2211/6656* (2013.01); *F15B 2211/75* (2013.01); *F15B 2211/761* (2013.01); *F15B 2211/857* (2013.01)

(58) Field of Classification Search
USPC ................. 137/487.5; 91/20, 392, 400, 459; 60/459, 468, 477
See application file for complete search history.

(56) References Cited

U.S. PATENT DOCUMENTS

| | | | | |
|---|---|---|---|---|
| 5,146,746 | A * | 9/1992 | Nagai | B66F 9/22 60/427 |
| 5,513,551 | A * | 5/1996 | Morishita | E02F 9/2214 91/459 |
| 5,666,295 | A * | 9/1997 | Bruns | B66F 17/003 177/139 |
| 6,135,694 | A * | 10/2000 | Trego | B66F 9/24 414/21 |
| 6,779,340 | B2 * | 8/2004 | Pfaff | E02F 9/2025 60/422 |
| 7,434,393 | B2 * | 10/2008 | Hesse | E02F 9/2296 60/422 |
| 7,562,616 | B2 | 7/2009 | Stolten | |
| 7,770,697 | B2 * | 8/2010 | Futahashi | B66F 9/22 187/224 |
| 8,726,646 | B2 * | 5/2014 | Riedel | F15B 11/163 60/422 |
| 9,057,437 | B2 * | 6/2015 | Kaneko | F16H 61/431 |
| 9,279,736 | B2 * | 3/2016 | Hughes | G01L 27/00 |
| 2011/0289911 | A1 * | 12/2011 | Vonderwell | F15B 7/006 60/431 |
| 2013/0013159 | A1 * | 1/2013 | Moriki | B66F 9/20 701/50 |
| 2013/0269332 | A1 * | 10/2013 | Suk | E02F 9/2217 60/420 |
| 2013/0277584 | A1 * | 10/2013 | McKernan | B66F 9/22 251/129.01 |
| 2014/0123634 | A1 * | 5/2014 | Heybroek | E02F 9/2217 60/327 |
| 2014/0241840 | A1 * | 8/2014 | Tsuruta | B66F 9/22 414/639 |
| 2014/0331659 | A1 * | 11/2014 | Kato | F16H 61/475 60/327 |
| 2014/0366951 | A1 * | 12/2014 | Vigholm | E02F 9/2217 137/14 |
| 2016/0290367 | A1 * | 10/2016 | Lillemets | B62D 5/064 |
| 2017/0292243 | A1 * | 10/2017 | Okada | E02F 3/435 |

FOREIGN PATENT DOCUMENTS

| | | |
|---|---|---|
| CN | 103154756 A | 6/2013 |
| CN | 104066897 A | 9/2014 |
| DE | 19831144 A1 | 1/2000 |
| EP | 2842905 A1 | 3/2015 |
| JP | 2000159499 A | 6/2000 |
| JP | 2002300100 A | 10/2002 |
| JP | 2004268646 A | 9/2004 |
| JP | 2005213591 A | 8/2005 |
| JP | 2009249070 A | 10/2009 |

OTHER PUBLICATIONS

JP2002300100A—English translation.
JP2004268646—English translation.
JP2005213591A—English translation.
JP2009249070A—English translation.
Chinese Office Action and Search Report issued by the State Intellectual Property Office (SIPO) dated Oct. 13, 2017; Chinese Patent Application No. 2016105753209; Danfoss Power Solutions Inc., 5 pgs.
Chinese Office Action and Search Report issued by the State Intellectual Property Office (SIPO) dated Oct. 13, 2017; Chinese Patent Application No. 2016105753209; Danfoss Power Solutions Inc., 5 pgs.—English translation.
CN102301582A—English translation.
CN103154756A—English translation.
DE19831144A1—English translation.
CN102537473A—English translation.
Chinese Second Office Action issued by the State Intellectual Property Office (SIPO) dated Jul. 11, 2018; Chinese Patent Appl. No. 201610575320.9, Danfoss Power Solutions GmbH & Co. OHG, 5 pages.
Chinese Second Office Action issued by the State Intellectual Property Office (SIPO) dated Jul. 11, 2018; Chinese Patent Appl. No. 201610575320.9, Danfoss Power Solutions GmbH & Co. OHG, 5 pages.—English Translation.
CN104066897A—English translation.

* cited by examiner

LOAD DEPENDENT ELECTRONIC VALVE ACTUATOR REGULATION AND PRESSURE COMPENSATION

CROSS REFERENCE TO RELATED APPLICATION

This application claims priority to Provisional Application U.S. Ser. No. 62/198,877 filed on Jul. 30, 2015, all of which are herein incorporated by reference in their entirety.

BACKGROUND OF THE INVENTION

The invention relates to an electronic valve actuator of a hydraulic system. The invention relates particularly to regulating an electronic valve actuator through load dependence and pressure compensation.

A hydraulic actuator or cylinder is well known in the art and is used to give unidirectional force through a unidirectional stroke. Hydraulic actuators have many applications such as construction equipment, manufacturing machinery and civil engineering.

Hydraulic actuators get their power from pressurized hydraulic fluid. The flow of hydraulic fluid to and from the actuator is controlled by a valve. Depending upon the application, hydraulic actuators are faced with loads that vary greatly. In these situations, the requirements which need to be accounted for by the actuator conflict with the requirements that need to be accounted for in the valve. For example, with light loads, the valve area needs to be large to allow for high actuator speeds. When the loads are large, the valve area needs to be quite small to prevent excessive actuator speeds.

Typically, the valve opening area is proportionally commanded by the operator's input. For example, a 0-100% joystick command results in a 0-100% valve opening area. This can result in poor resolution. When actuator velocity is 0-100%, poor resolution occurs when the valve opening area is 0-10% and the joystick command is also limited from 0-10%.

One method to address this issue is to use a hydraulic compensator that regulates pressure drop across the control orifice area of the valve to a relatively constant pressure drop. A problem with this approach is that when the maximum valve area needs to be oversized for a light load condition, the compensator adds additional pressure drop even when fully open, reducing the maximum lowering velocity of the light load.

To avoid unsafe lowering velocities with high loads, a flow limiting valve may be used, but this still carries the issue of poor resolution when lowering high loads (e.g. a 10% joystick command can result in 100% actuator velocity).

Safety issues are particularly present when actuators are used with a forklift hoist. The lowering function for a forklift hoist usually works by gravity of the fork whether loaded or not. Without pressure compensation, the larger the load the higher the acceleration would be. This causes an unsafe operating condition for an operator.

SUMMARY OF THE INVENTION

The objective upon which the invention is based is to use pressure information and re-scaled operator input to command actuator velocity instead of valve area. At the same time the system should reduce cost, have optimum performance, good input resolution, and offer more flexibility.

This objective is achieved by using pressure information to determine a maximum allowed operator input or valve opening area that can be allowed to limit excessive actuator speeds. Then, the operator's input command is re-scaled to the allowed valve area to directly command actuator velocity.

Preferably, maximum allowed operator input command (i.e. valve opening area) is estimated by using stored pre-determinative information, such as a 2-D look-up table or determinative information calculated using system pressure. Alternatively, the maximum operator input command is calculated based on the difference between the sensed pressure and tank pressure, and control it to a predefined pressure difference using a proportional-integral-derivative (PID) control, to provide a soft pressure compensation.

Operator input re-scaling, or soft scaling preferably involves modifying an operator input command using input conditioning blocks. Based on a comparison of the maximum allowed input command and the modified input command a signal is passed through to the proportional valve enable (PVE) having a good resolution to command the actuator instead of the valve spool area.

The invention is explained in more detail below by means of exemplary embodiments illustrated in the Figures.

DETAILED DESCRIPTION OF THE PREFERRED EMBODIMENTS

Figure 1:
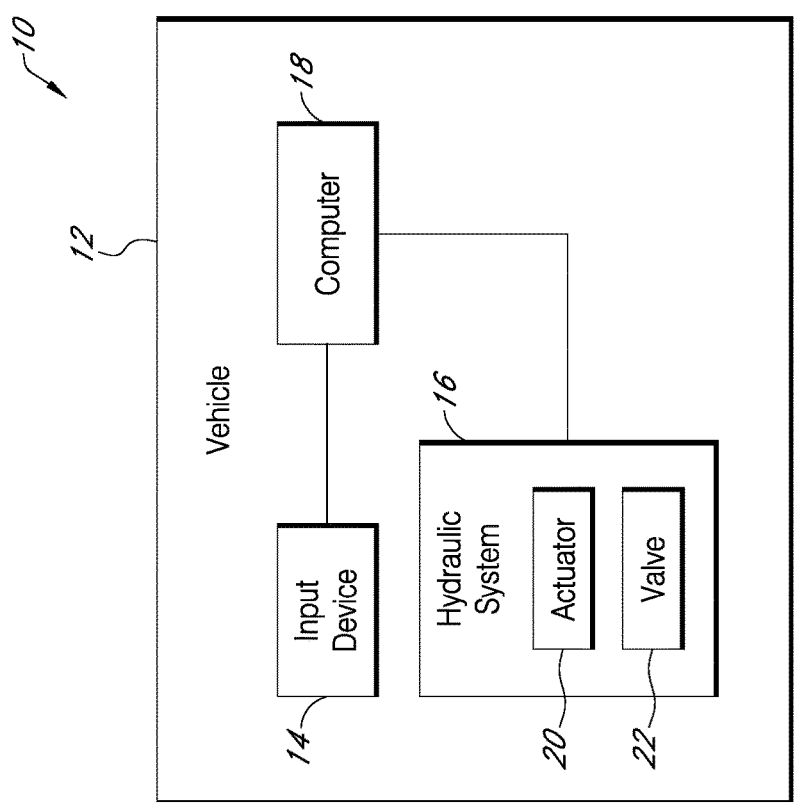
FIG. 1 is a schematic view of a hydraulic control system.

FIG. 1 shows a schematic view of a system 10 that has load dependent electronic valve actuator regulation and pressure compensation. The system includes a vehicle 12 having an operator input device 14, a hydraulic system 16 for moving a load, and a controller 18 that is connected to input device 14. The hydraulic system has an actuator 20 and a valve 22 that controls flow to and from the actuator 20. For clarity, FIG. 1 shows only the essential elements of system 10 where the system 10 uses pressure information from the hydraulic system 16 to determine a maximum opening area for valve 22 that can be allowed to limit excessive speed of actuator 20. The controller 18 also conditions or re-scales the operator input command to the allowed valve area so that actuator 20 velocity is commanded instead of valve area which results in good input resolution. Poor resolution occurs where actuator velocity is not proportional to the operator input command and the valve opening area. By re-scaling the operator command to the maximum allowed valve area, the command for actuator velocity becomes proportional to the allowed valve opening area resulting in good resolution.

The system 10 is used with any application that utilizes gravitational force to move the actuator and load. As one example of many, a preferred system 10 includes a fork lift 12 having a hoist 24 and a joystick used as the operator input device 14.

Figure 2:
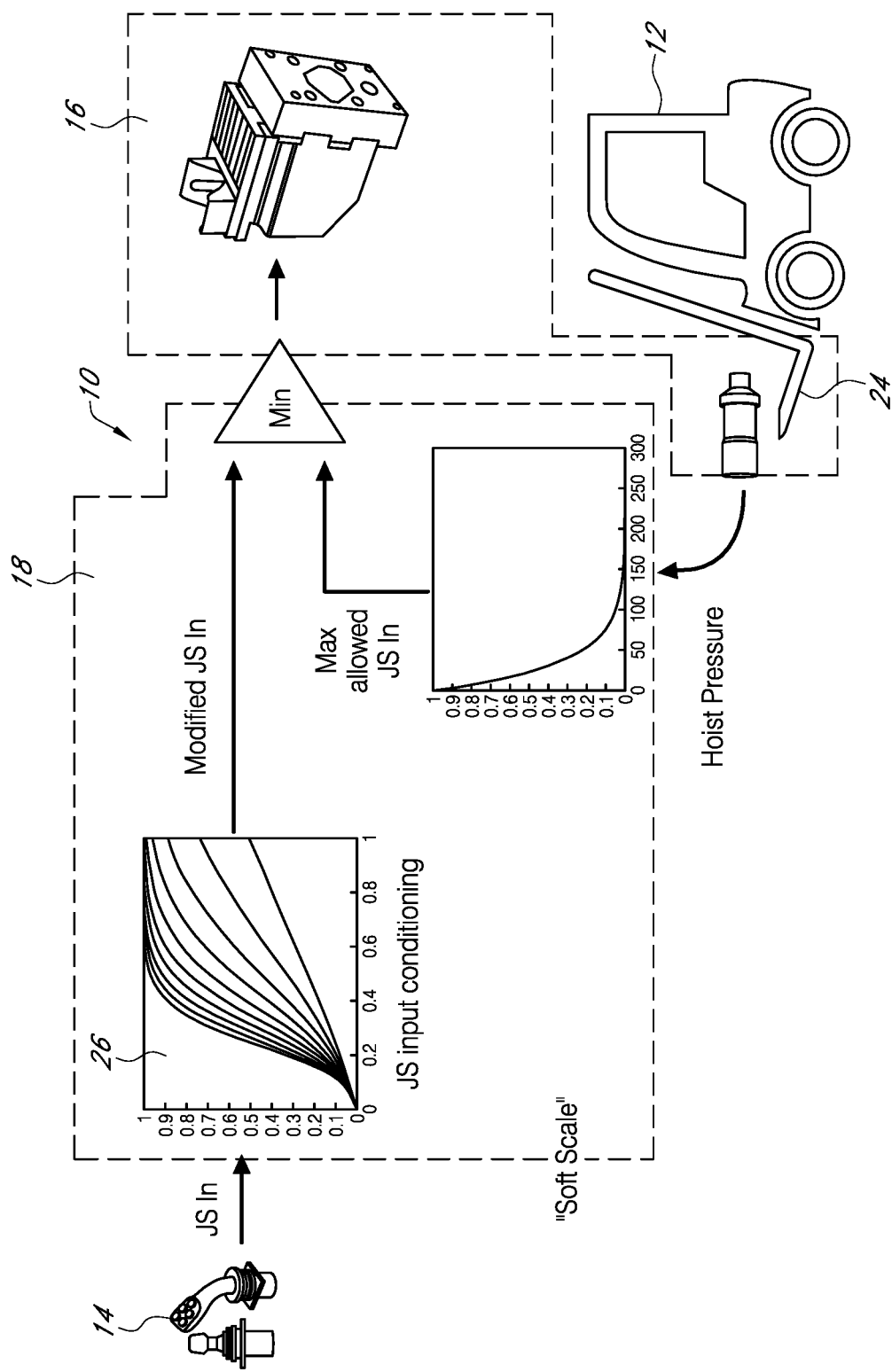
FIG. 2 is a schematic view of a hydraulic control system having soft scaling.

FIG. 2 shows a schematic view of a system that includes a provision for soft scaling of the operator input command. An input conditioning block 26 is used to modify or rescale the operator input command which is then compared by controller 18 to an estimated maximum allowed operator (Joystick) command calculated from determinative information such as hoist pressure feedback. Alternatively, the maximum allowed operator command is determined from pre-determinative information stored in the controller 18, such as a 2-D look-up table or the like. Input conditioning blocks 26 such as Soft Ramp™, Profile™, and the like may be used from the Danfoss Power Solutions PLUS+1™ Work Function Library. The absolute minimum of the modified input command and the estimated maximum allowed operator input is allowed to pass to the PVE. As a result, the PVE command is always defined based on hoist pressure feedback which provides smooth lowering independent of load size.

Figure 3:
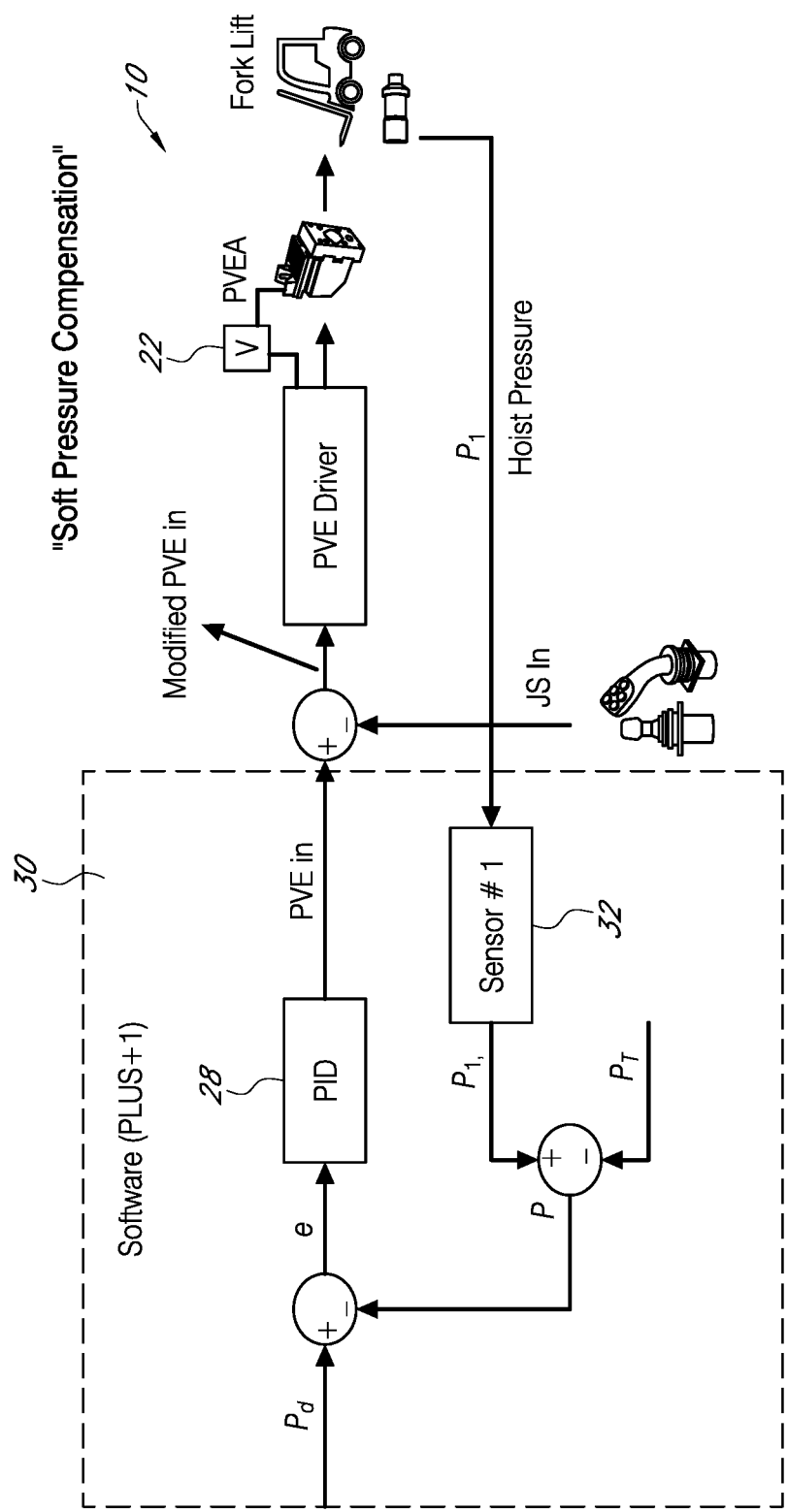
FIG. 3 is a schematic view of a hydraulic system having soft pressure compensation.

FIG. 3 shows a schematic view of system 10 that includes a provision for soft pressure compensation. Preferably a proportional-integral-derivative (PID) controller 28 and technique is used to obtain constant pressure drop across the main spool of valve 22 without the need for compensation arrangements. To begin, a desired pressure margin (drop) $P_d$ across an uncompensated spool valve 22 is defined in the software 30. The pressure margin $P_d$ can be changed using a service tool.

System pressure P is calculated based on hoist pressure $P_1$, that is detected by Sensor 32 to provide hoist pressure feedback $P_1$ and a previously estimated tank pressure $P_T$ or $P_T$ can be directly measured by a separate pressure transducer. The desired tank pressure $P_T$ can be determined based on an estimate of an average pressure drop across the spool valve 22 when lowering the hoist with different load situations. The PID 28 calculates an error e based on the desired pressure margin $P_d$ and calculated system pressure.

The PID output, or PVEin is then compared by controller 18 to the operator input command to provide a modified PVEin. The modified PVEin is passed on to the PVE driver which commands the proportional valve enable actuator (PVEA). If tuned properly, the PID control 28 can minimize error e to obtain load independent constant pressure drop across the main spool valve 22. Soft pressure compensation lowering may be assisted by gravity where pump flow is not required. Thus, a hydraulic control system has been disclosed that at the very least meets all of the stated objectives.

What is claimed is:

1. An electronic valve actuator system, comprising:
   a controller connected to an input device and a hydraulic system;
   the hydraulic system having a valve that controls flow to and from an actuator;
   wherein, based on pressure information received from the hydraulic system, the controller determines a maximum allowed opening area for the valve and rescales an operator input command from the input device to the maximum allowed opening area to command a velocity of the actuator to achieve good input resolution.

2. The system of claim 1 wherein an input conditioning block is used to rescale the operator input command.

3. The system of claim 1 wherein a predeterminative value is stored in the controller and used to estimate a maximum allowed input command.

4. The system of claim 1 wherein the controller sends a command to the actuator that is the absolute minimum of the rescaled operator input command and the maximum allowed opening area.

5. An electronic valve actuator system, comprising:
   a controller connected to an input device and a hydraulic system;
   the hydraulic system having a valve that controls flow to and from an actuator;
   wherein the controller has software where a desired pressure margin is set and a proportional-integral-derivative controller obtains constant pressure drop across the valve; and
   wherein a proportional-integral-derivative output is compared to an operator input command by the controller to provide a modified PVE command to the actuator.

6. The system of claim 5 wherein the proportional-integral-derivative controller calculates an error based on the set pressure margin and a calculated system pressure.

7. The system of claim 6 wherein the controller is configured to calculate system pressure based upon hoist pressure detected by a sensor that provides hoist pressure feedback and a previously estimated tank pressure.

8. The system of claim 7 wherein tank pressure is estimated based on average pressure drop across the valve when lowering a hoist with different load situations.

9. The system of claim 5 wherein the modified PVE command is passed on to a PVE driver which commands the actuator.

10. A method of controlling a hydraulic system, comprising the steps of:
    determining a maximum allowed opening for a valve that controls flow to and from an actuator using a controller to limit speed of the actuator;
    rescaling an operator input command to the maximum allowed opening of the valve using the controller; and
    commanding actuator velocity using the controller based upon the rescaled operator input command.

11. The method of claim 10 wherein the maximum allowed opening for the valve is based upon pressure information from a hydraulic system.

12. The method of claim 10 wherein a conditioning block is used to rescale the operator input command.

13. The method of claim 10 wherein a maximum allowed operator command is calculated by the controller from determinative information.

14. The method of claim 10 wherein a maximum allowed operator command is determined from predeterminative information stored in the controller.

15. The method of claim 10 further including the steps of comparing with the controller the rescaled operator command with a maximum allowed operator input command and allowing the absolute minimum to pass through to a proportional valve enable.

16. The method of claim 10 wherein the step of determining the maximum allowed opening for the valve uses a proportional-integral-derivative controller to obtain constant pressure drop across the valve without a need for compensation arrangements.

17. The method of claim 10 further comprising the step of defining a desired pressure margin across the valve.

18. The method of claim 17 further comprising the step of calculating system pressure based on pressure detected by a sensor and previously estimated tank pressure.

19. The method of claim 16 further comprising the step of comparing an output from the proportional-integral-derivative controller with the operator input command to provide a modified proportional valve enable that commands a proportional valve enable actuator.

* * * * *